(12) United States Patent
Becht, III et al.

(10) Patent No.: US 12,077,128 B1
(45) Date of Patent: Sep. 3, 2024

(54) CATALYTIC CONVERTER TAMPER DETECTION SYSTEM AND METHOD OF USE

(71) Applicant: Accelerated Solutions Group, L.L.C., Houston, TX (US)

(72) Inventors: Charles Eugene Becht, III, Houston, TX (US); Tabish Anwar, Houston, TX (US)

(73) Assignee: Accelerated Solutions Group, LLC, Houston, TX (US)

( * ) Notice: Subject to any disclaimer, the term of this patent is extended or adjusted under 35 U.S.C. 154(b) by 0 days.

(21) Appl. No.: 18/074,278

(22) Filed: Dec. 2, 2022

Related U.S. Application Data

(60) Provisional application No. 63/335,427, filed on Apr. 27, 2022.

(51) Int. Cl.
| | |
|---|---|
| *B60R 25/10* | (2013.01) |
| *B60R 25/043* | (2013.01) |
| *B60R 25/102* | (2013.01) |
| *B60R 25/32* | (2013.01) |

(52) U.S. Cl.
CPC .......... *B60R 25/102* (2013.01); *B60R 25/043* (2013.01); *B60R 25/10* (2013.01); *B60R 25/32* (2013.01); *B60R 2025/1013* (2013.01)

(58) Field of Classification Search
CPC ....... B60R 25/043; B60R 25/10; B60R 25/32; B60R 2025/1013; B60R 25/102; G08B 13/1654; G08B 13/1436; F01N 2260/22
See application file for complete search history.

(56) References Cited

U.S. PATENT DOCUMENTS

| | | | | |
|---|---|---|---|---|
| 4,181,944 A | * | 1/1980 | Yamauchi | F02P 5/15 123/480 |
| 8,963,699 B2 | | 2/2015 | Potter | |
| 9,030,310 B2 | | 5/2015 | Van Siemeersch et al. | |
| 2003/0009271 A1 | * | 1/2003 | Akiyama | H04L 69/329 701/29.6 |
| 2014/0104048 A1 | * | 4/2014 | De Kock | G08B 13/1654 340/429 |
| 2014/0176320 A1 | | 6/2014 | Reed et al. | |
| 2014/0266654 A1 | * | 9/2014 | Parker | B60R 25/00 340/426.25 |
| 2018/0154908 A1 | * | 6/2018 | Chen | B60W 50/0097 |

FOREIGN PATENT DOCUMENTS

WO  2012164274 A1  12/2012

* cited by examiner

*Primary Examiner* — Nay Tun
(74) *Attorney, Agent, or Firm* — Akerman LLP

(57) ABSTRACT

Systems and methods for detecting tampering with a catalytic converter by using a catalytic converter sensor located outside of the exhaust system that is configured to sense vibrations from vehicle exhaust components and output that to a catalytic converter module. The catalytic converter module activates an alarm system if at least one vibration exceeds a vibration threshold for an amount of time that exceeds a duration threshold. The alarm system may include any combination of activating the integrated vehicle alarm module, an external catalytic converter alarm module, or transmitting a wireless alert to a server or user devices.

18 Claims, 5 Drawing Sheets

CATALYTIC CONVERTER TAMPER DETECTION SYSTEM AND METHOD OF USE

CROSS-REFERENCE TO RELATED APPLICATIONS

This application for patent claims the benefit of priority to and incorporates herein by reference U.S. Provisional Application Ser. No. 63/335,427 filed Apr. 27, 2022.

TECHNICAL FIELD

This invention relates to providing a notification associated with an actual or attempted tampering or theft of at least one catalytic converter installed in a vehicle.

DESCRIPTION OF THE RELATED ART

Catalytic converters are valuable and easily stolen, making them an attractive target for thieves. The precious materials (e.g., platinum) used to make catalytic converters make them valuable as thieves can sell them to scrapyards or metal recycling plants and get several hundred dollars for a standard catalytic converter and over a thousand dollars for a catalytic converter from a hybrid vehicle.

Catalytic converters are part of the vehicle exhaust system and therefore attached to the exterior of a vehicle, usually the bottom of the chassis, making them an easy target for thieves as the thieves do not have to break into the vehicle. By using a tool, such as reciprocating saw that can cut through metal, thieves can typically remove a catalytic converter in less than a few minutes. Thieves may target trucks transporting vehicles (e.g., between the factory and the dealership), rail cars transporting vehicles, vehicle dealerships (e.g., during a time when the dealership is closed), vehicle depots (e.g., where school buses are parked), or the like. Thieves may target a time period when a dealership is closed to target vehicles in a dealership or a time period when people are asleep to target a parking lot. In this way, thieves can steal multiple catalytic converters in just a few minutes. Trucks, sport utility vehicles (SUVs) and other vehicles may be especially targeted because the higher ground clearance of such vehicles allows for easy access to the catalytic converter.

In addition, the thefts may go unnoticed for a significant amount of time because the catalytic converter is mounted on the bottom of the chassis of the vehicle and the factory installed vehicle alarm module does not monitor for or detect theft of the catalytic converter. For example, the theft may not be detected until the engine of the vehicle is started or the vehicle exhaust system is visually inspected, thereby providing the thieves with ample time to escape.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In an embodiment the system and method of using a tamper detection system for a vehicle, wherein the vehicle includes at least one vehicle exhaust system and at least one vehicle exhaust component, wherein at least one vehicle exhaust component is a catalytic converter. The tamper detection system includes a catalytic converter sensor, wherein the catalytic converter sensor is configured to monitor for at least one vibration from at least one of the vehicle exhaust components; and a catalytic converter module configured to monitor the catalytic sensor output for at least one vibration that exceeds a vibration threshold for at least an amount of time that exceeds a duration threshold. The catalytic converter sensor is located on the vehicle outside of the vehicle exhaust system. The catalytic converter module is configured to activate an alarm system when the vibrational threshold is exceeded for at least an amount of time that exceeds the duration threshold. The alarm system is any combination of the vehicle alarm module, a catalytic converter alarm module, and a wireless alert communication module. In preferred embodiments, the catalytic converter sensor is a vehicle knock sensor, the catalytic converter module is a vehicle electronic control unit (ECU), the alarm system is a vehicle alarm module, and/or the alarm system may include a wireless alert communication module transmitting to a server and a user device.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
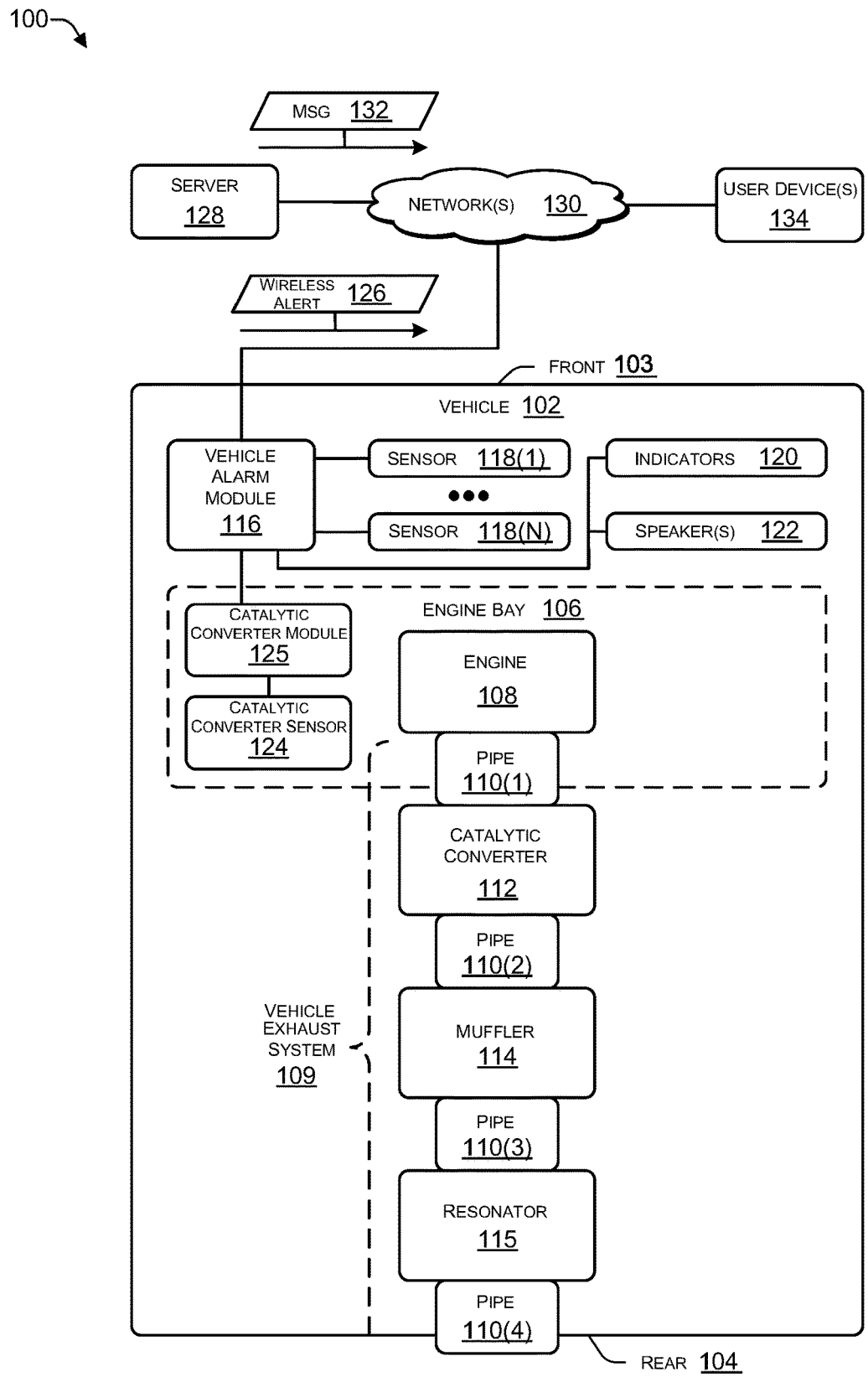
FIG. 1 is a block diagram of a system that includes a vehicle with a catalytic converter sensor, according to some embodiments.

In one embodiment, the systems and techniques use a dedicated catalytic converter sensor and a catalytic converter module to support functions similar to or otherwise tie into the alarm system (e.g., a factory installed vehicle alarm module, a catalytic converter alarm module, wireless alert communication module, or another alarm system) in a vehicle (e.g., a passenger car, a sport utility vehicle, light duty truck, heavy duty truck, bus, motorcycle, boat, or another type of vehicle with a catalytic converter). The catalytic converter sensor and catalytic converter module monitor the catalytic converter for events that indicate possible tampering with the catalytic converter. If certain criteria are met, then the catalytic converter module signals the alarm system, in a manner similar to other alarm system sensors, such as a door being opened, glass being broken, or the like to trigger some type of visual and/or audible alarm. The term door as used herein refers to the driver door, one or more passenger doors, the hood (e.g., the hinged cover to the engine compartment), and the trunk lid, the hatch of a hatchback, or any combination thereof. For example, if the alarm is set (e.g., the alarm is placed in an active mode), then the catalytic converter module signaling the alarm system may cause (1) a loud audible alarm to sound, (2) cause the headlights (and in some cases, the taillights) to repeatedly flash on and off, or both. If the alarm is not set (e.g., the alarm is not in the active mode), then the catalytic converter module signaling the alarm system may function differently depending on how the alarm system is configured (e.g., either when the alarm system is installed or via user configured options). For example, the alarm system may be configured to (1) ignore the signal and take no action, (2) provide a softer audible alarm (e.g., similar to a "door is ajar" alarm), or (3) cause a light on a dashboard to be displayed (and in some cases, an app on the user's phone may display a notification). In some cases, the alarm system may be configured to ignore the catalytic converter module signal and not raise an alarm when the vehicle is being serviced, when the vehicle is being driven, or in other situations in which an alarm is not desired.

The catalytic converter sensor may be any sensor capable of detecting vibrations indicative of theft, for example a microphone, a piezoelectric or piezoresistive device, a vibration sensor such as an accelerometer. For example in a preferred embodiment the catalytic converter sensor is the existing knock sensor located in an engine block. The catalytic converter sensor may be a ruggedized sensor that can function in harsh environments, such as being located in the engine compartment or on the underside of the chassis of the vehicle, and capable of functioning in a wide range of temperatures (e.g., at least −40 to +120 Celsius) and a wide range of humidity/moisture conditions (e.g., rain, sleet, hail, snow, and the like).

The catalytic converter sensor may, in some cases, be a microphone (or another type of transducer). In such cases, the catalytic converter sensor may provide audio data to the catalytic converter module. The catalytic converter module may periodically determine a loudness (e.g., in decibels (dB)) of the audio data. If the audio data exceeds a threshold amount of loudness (e.g., X dB, such as 40 dB, 50 dB, 60 dB, 70 dB, 80 dB, or the like) for a for at least an amount of time that exceeds the duration threshold (e.g., Y milliseconds, such as 600, 1000, 2000, 3000, or the like), then the catalytic converter module may signal the alarm system that a potential issue has been detected (e.g., similar to a door being opened). In some cases, the catalytic converter module may filter the audio data to create filtered audio data and determine if the filtered audio data exceeds a threshold amount of loudness for a threshold amount of time. The filter may be used to filter out frequencies unrelated to a cutting tool. For example, a reciprocating saw (a tool frequently used in the theft of catalytic converters) typically exhibits wideband energy between about 1-4 kHz. In this example the catalytic converter module may filter out frequencies below about 1 kHz and above about 4 kHz. Of course, one or more of the filter frequencies, the threshold amount of loudness, and the duration threshold, may be adjustable prior to or during installation of the catalytic converter module in the vehicle.

The catalytic converter sensor may also use the detection of vibration as a method to trigger the desired output. This may be through the use of a piezoelectric or piezoresistive device mounted directly to the engine block (such as the existing knock sensor installed on the vehicle), mounted directly to the frame, or any member mounted directly to the frame. In the case of being mounted to the engine block this may be re-purposing the existing engine knock sensor to monitor for cutting of the exhaust system while the vehicle is turned off. In an embodiment, knock sensors in the engine block can detect light tapping on exhaust near catalytic converters (in some cases 5-10 m V output at engine electronic control unit (ECU)). This device will easily detect the vibrations caused by the cutting of the exhaust. With sufficient resolution in the system it may be possible to detect the tampering/cutting of additional components through these sensors. Such as if a plate is installed on the vehicle frame/frame members and is configured to block access to the catalytic converter, the engine knock sensor may be able to detect the use of an impact wrench or the like to remove or the cutting of this plate. The sensors may also be mounted directly to the vehicle frame/unibody or directly onto a panel blocking access to the catalytic converters. This piezoelectric or piezoresistive device may be designed in such a way to target specific frequency ranges. In this case, the catalytic converter module may measure vibrational energy (e.g., millivolts per G, where G is the gravitational constant).

The catalytic converter module may periodically take measurements to determine an ambient level and create a baseline. The catalytic converter module may be an external catalytic converter module or a vehicle electronic control unit (ECU). For example, the catalytic converter module may create a baseline measurement for every P minutes (P>0) over a particular time interval (e.g., 24 hours or greater). After creating the baseline measurement, the catalytic converter module may continue to receive vibration readings from the catalytic converter sensor and subtract the baseline measurement from the current vibration measurement to determine a difference measurement. In some cases, the difference measurement may be filtered while in other cases the difference measurement may not be filtered. If the difference measurement (between the baseline measurement and the current vibration measurement) exceeds a threshold, then the catalytic converter module may provide a signal to the alarm system to raise the alarm.

In one embodiment, the catalytic converter sensor may not be a microphone (e.g., a transducer) but rather may be a vibration sensor (e.g., accelerometer) mounted directly to the engine block, mounted directly to the frame, or any member mounted directly to the frame. For example, if a physical panel or plate is mounted on the vehicle frame/frame members, configured to cover over and block access to the catalytic converter, the catalytic converter sensor may be mounted on the panel or plate to detect an attempt to remove (e.g., cut off portions of) the panel or plate. In such cases, the plate is not mounted directly on the vehicle exhaust system. In such cases, the data from the catalytic converter sensor may be accumulated to establish a baseline. After the catalytic converter module establishes the baseline, the catalytic converter module may subtract the baseline from the current vibrational data to determine a difference. The catalytic converter module may determine whether the difference exceeds a vibration threshold for at least an amount of time that exceeds the duration threshold before signaling the alarm system to raise the alarm. In some cases, the catalytic converter module may filter the difference to reduce false positives (e.g., false triggering). For example, the filtering may be used to reduce the possibility of a loud noise, such as motorcycle near the vehicle, from triggering the alarm system.

In some cases, the catalytic converter sensor and catalytic converter module may be integrated with the vehicle factory system while in other cases they may not be integrated with the factory system but may instead function as a separate system to detect and deter the theft of the catalytic converter from the vehicle. In such cases where the catalytic converter sensor and catalytic converter module function as integrated into the alarm system, the catalytic converter sensor, in this embodiment the knock sensor, will send output to the catalytic converter module, in this embodiment the vehicle electronic control unit (ECU), this will provide an additional function to the vehicle electronic control unit (ECU) responsible for the alarm system, in this embodiment the vehicle alarm module, functions. If integrated, the vehicle electronic control unit (ECU) (the catalytic converter module) will monitor the existing engine knock sensor (the catalytic converter sensor) during engine off periods, and activate the vehicle alarm module (the alarm system) if tampering is detected. In such cases where the catalytic converter sensor and catalytic converter module function as a separate system, the catalytic converter module may be connected to a separate alarm system, such as horn or speaker and/or visual indicator(s), that the catalytic converter module uses to signal that unusual activity, indicative of a catalytic converter theft, may be occurring.

The alarm system may include a wireless communications module that enables either to send a wireless alert, e.g., via a Wi-Fi network (e.g., when the car is located in a dealership) or using cellular data. For example, a client-server architecture may be created at a car dealership, marshalling yard, storage lot, warehouse, railyard, bus depot, on a rail car, or other environment where multiple vehicles are present. Individual vehicles may have a catalytic converter module installed which acts as a client. When the catalytic converter module detects that a potential catalytic converter theft is occurring, the catalytic converter module or the alarm system may notify, via a wireless alert, a server (e.g., a central monitoring system running on a central server). In some cases, the wireless alert may provide information to identify the vehicle (e.g., make and model of the vehicle, location of the vehicle, or the like).

FIG. 1 is a block diagram of a system 100 that includes a vehicle with a catalytic converter sensor, according to some embodiments. The system 100 includes a vehicle 102. A lower portion of the chassis of the vehicle 102 (e.g., bottom view) is illustrated in FIG. 1.

The arrangement of components in a typical vehicle is illustrated in FIG. 1. The vehicle 102 has a front 103 and a rear 104. An engine bay 106 is located near the front 103 of the vehicle 102 and includes an engine 108 and a vehicle exhaust system 109. The vehicle exhaust system 109 includes a pipe 110(1) that connects the engine 108 to a catalytic converter 112, a pipe 110(2) that connects the catalytic converter 112 to a muffler 114, a pipe 110(3) that connects the muffler 114 to a resonator 115, and a pipe 110(4). In some cases, one or more of the pipes 110 may also be referred to in specialized terms. For example, the pipe 110(1) may be referred to as an exhaust manifold, exhaust pipe, downpipe, or the like. As another example, the pipe 110(4) may be referred to as the tailpipe. For ease of illustration, other components, such as clamps used to secure each of the pipes 110 to the various components of the vehicle exhaust system 109, hangers used to secure the pipes 110 to the chassis, and the like have not been shown in FIG. 1. To remove the catalytic converter 112, a thief may use a tool, such as reciprocating saw or similar tool, to cut into the pipe 110(1) and the pipe 110(2). With the right tool, each of the pipes 110 can be sawed through in 7 to 10 seconds, thereby enabling the thief to remove the catalytic converter 112 in just a few minutes.

The vehicle 102 may include a vehicle alarm module 116, multiple sensors 118(1) to 118(N) (N>0), indicators 120, and one or more horns or speakers 122 that may be collectively referred to as the alarm system. The sensors 118 may include, for example, switches that detect when a door (e.g., driver's door, passenger's door, trunk lid, hood lid, hatch, or the like) has been opened. For example, the sensors 118 may be "normally closed" switches that change to "open" when one of the doors is opened; or in contrast, where the sensors 118 may be "normally open" switches that change to "closed" when one of the doors is closed. This change in the status of the sensors 118 is detected by the vehicle alarm module 116 and causes the vehicle alarm module 116 to provide an indication using the indicators 120, the speakers 122, or both.

The vehicle alarm module 116 may have two states, armed (e.g., in which the doors are locked) and unarmed (e.g., in which the doors are unlocked). In the unarmed state, if the vehicle alarm module 116 receives an indication from one of the sensors 118 that a particular door has been opened, then the vehicle alarm module 116 may cause one of the corresponding indicators 120 to indicate that the particular door is open. For example, the indicators 120 may include indicators that are displayed on a display in a dashboard of the vehicle 102. In some cases, the vehicle alarm module 116 may cause one or more of the speakers 122 to provide an audible alert (e.g., beeping sound or the like) that the particular door is open. The audible alert provided when the alarm module is unarmed may be relatively quiet. In the armed state, if the vehicle alarm module 116 receives an indication from one of the sensors 118 that a particular door has been opened, then the vehicle alarm module 116 may cause the indicators 120 to indicate that someone may be attempting to break into the vehicle. For example, the indicators 120 may include headlights, taillights, side markers, or any combination thereof. In the armed state, if the vehicle alarm module 116 receives an indication from one of the sensors 118 that a particular door has been opened, then the alarm module 116 may cause one or more of the speakers 122 to provide an audible alert by causing a horn of the vehicle 102 to periodically make a sound or cause the speakers 122 to admit an audible alert (e.g., siren or the like) that is loud (e.g., louder than the indication provided when the vehicle alarm module 116 is in the unarmed state).

As illustrated in FIG. 1, the system 100 may supplement the alarm system (e.g., 116, 118, 120, 122) with a catalytic converter sensor 124 and a catalytic converter module 125. In such cases, the catalytic converter module 125 may appear to the vehicle alarm module 116 as another one of the sensors 118 (e.g., a switch that indicates whether a door is open or closed). For example, when the output of sensor data from the catalytic converter sensor 124 indicates that a theft of the catalytic converter 112 may be occurring, then the catalytic converter module 125, sensing output from the catalytic converter sensor 124, may signal to the vehicle alarm module 116, in a manner similar to one of the sensors 118, indicating that something is amiss (e.g., similar to a door being opened). If the sensors 118 are "normally closed" switches that transition to an open state when the doors opened, the catalytic converter module 125 may provide a closed state signal to the vehicle alarm module 116 when the output of sensor data from the catalytic converter sensor 124 does not indicate any activity and may provide an open state signal to the vehicle alarm module 116 when the data from the catalytic converter sensor 124 indicates suspicious activity. For example, the suspicious activity may be based on determining that the output of sensor data from the catalytic converter sensor 124 has exceeded a decibel threshold or vibration threshold level (e.g., X decibels, X>about 50 dB; X G, X>about 0.3 G) for at least an amount of time that exceeds a duration threshold (e.g., at least Y milliseconds, Y>about 500 ms). Of course, the catalytic converter module 125 may be configured to provide a signal to the vehicle alarm module 116 based on the type of signal that the vehicle alarm module 116 is expecting. Thus, while the examples provided herein use an alarm module that receives a closed signal from the sensors 118 when a door is in a closed state and an open signal from the sensors 118 when a door in an open state, it should be understood that the catalytic converter module 125 may be configured to provide other types of signals, in keeping with the type of the vehicle alarm module 116.

While the catalytic converter sensor 124 and the catalytic converter module 125 are illustrated in FIG. 1 as being located in the engine bay 106, the catalytic converter sensor 124 and the catalytic converter module 125 may be located anywhere on the vehicle 102 outside of the vehicle exhaust system 109. The catalytic converter sensor 124 may be a ruggedized sensor and may be placed in a location on the vehicle 102 (e.g., underneath the vehicle) where the catalytic converter sensor 124 can detect the sound or vibration of a cutting tool or any tool that may be used to remove any exhaust or panel to gain access to the exhaust or any other components of the vehicle underbody. Preferably, the catalytic converter sensor 124 is hidden in the location (or disguised using an exterior enclosure) on the vehicle 102 in a way that a potential thief does not recognize that it is a sensor that is part of a catalytic converter theft deterrent system.

While the system 100 illustrates the catalytic converter sensor 124 and the catalytic converter module 125 as being integrated with the alarm system as a vehicle alarm module 116, in some cases, the alarm system will be a catalytic converter alarm module installed independent of (e.g., not integrated with) the vehicle alarm module. In such cases, the catalytic converter module 125 may include a separate mechanism to provide an indication that someone is attempting to steal the catalytic converter 112. If the catalytic converter alarm module is a separate unit, for ease of installation, in some cases, the catalytic converter sensor 124 may be integrated into the catalytic converter module 125 while in other cases the catalytic converter sensor may be separate from the catalytic converter module 125. The catalytic converter module 125 may include the catalytic converter alarm module with an audio alarm, such as an alarm signal generator and a horn or speaker, and/or a visual alarm system, such as flashing lights.

Whether or not the catalytic converter sensor 124 and catalytic converter module 125 are integrated with the vehicle alarm module, the catalytic converter module 125 may include a wireless communications module that wirelessly transmits a wireless alert 126 or other communication to one or more user devices 134 (e.g., a smart phone associated with an owner of the vehicle, a key fob associated with the vehicle, or a central computer to monitor the vehicles at a dealership, or the like) or a server 128 (e.g., a central server in the case of a dealership, a bus depot, or the like). The wireless alert 126 may be wirelessly transmitted using one or more networks 130 that may include a Wi-Fi network (e.g., if the vehicle 102 has the capability to act as a Wi-Fi hotspot), a cellular communications network, a near field communication (NFC) network, another type of network, or any combination thereof. If the wireless alert 126 is sent to the server 128, then the server 128 may send a message 132 to one or more of the user devices 134 indicating the potential theft of the catalytic converter 112. For example, in the case of a dealership, the vehicle alarm module 116 may send the wireless alert 126 via the networks 130 to the server 128 located at the dealership. In response to receiving the wireless alert 126, the server 128 may send the message 132 to one or more of the user devices 134. The user devices 134 may be associated with a security company that is guarding the dealership, one or more employees of the dealership, or any combination thereof.

Thus, a catalytic converter sensor and a catalytic converter module may be used to detect when an attempt is being made to remove a catalytic converter installed in a vehicle. In some cases, the catalytic converter sensor and the catalytic converter module may be integrated with the vehicle alarm module and cause the vehicle alarm module to provide an indication similar to detecting when a door is open or close. In other cases, the catalytic converter sensor and the catalytic converter module may be separate from the vehicle alarm module and may be configured to provide an audible alert. The catalytic converter module may be capable of wirelessly transmitting wireless alert to a server or central server, one or more user devices, or a combination of both. In this way, by adding the catalytic converter sensor and the catalytic converter module to vehicles (e.g., at the factory, after arriving at the dealership, as an aftermarket alarm, or the like) the thefts of the catalytic converters included in the exhaust system of the vehicles can be deterred, and/or appropriate vehicle owners or others may be notified of or receive information regarding such actual or attempted thefts. For example, when someone turns on a reciprocating saw near the exhaust system, the catalytic converter module may detect the sound and provide an audible alert (e.g., either by itself or using the alarm system) to deter the thief from cutting into a portion of the exhaust system. In other applications the system may detect the vibrations associated with contact between a metal tool and the vehicle frame, exhaust, or ancillary components and trigger an audible alert (e.g., either by itself or using the alarm system) to deter the thief. The thresholds of the catalytic converter module may be adjusted such that the catalytic converter module provides the audible alert before the thief has an opportunity to cut into the exhaust system.

Figure 2:
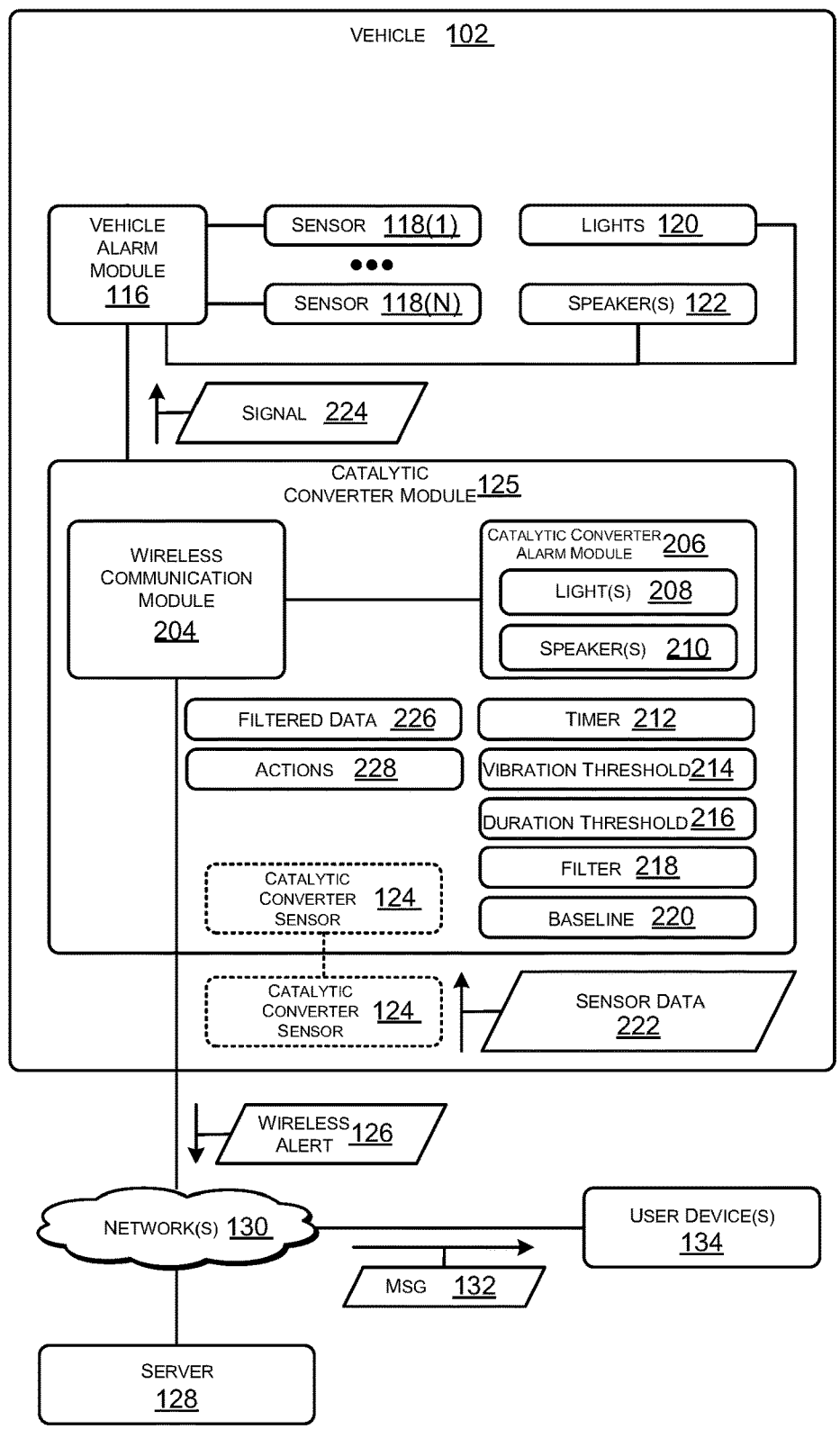
FIG. 2 is a block diagram of a vehicle that includes an alarm system, according to some embodiments.

FIG. 2 is a block diagram 200 of a vehicle that includes an alarm system, according to some embodiments. FIG. 2 illustrates additional details associated with the catalytic converter module 125 of FIG. 1. The catalytic converter sensor 124 may be integrated into the catalytic converter module 125 or may be separate from the catalytic converter module 125. The vehicle alarm module 116 may be connected to an electronic control unit (ECU) of the vehicle 102 via a vehicle bus (e.g., controller area network (CAN), Media Oriented Systems Transport (MOST), or similar).

The catalytic converter module 125 may include a wireless communication module 204 that is capable of sending the wireless alert (or other communication) 126 to the server 128, the user devices 134 or both via the networks 130. If the catalytic converter module 125 is used as a standalone catalytic converter theft deterrent system, then the catalytic converter module 125 may include a catalytic converter alarm module 206 that may include one or more lights 208, one or more horns or speakers 210, or any combination thereof. The catalytic converter module 125 may include: a timer 212, a vibration threshold 214 (e.g., a loudness threshold or a vibration threshold), a duration threshold 216 (e.g., a duration threshold in milliseconds), a filter 218, a baseline 220, or any combination thereof.

The catalytic converter sensor 124 may periodically (e.g., at a predetermined time interval) provide an output of sensor data 222 to the catalytic converter module 125 or the catalytic converter module 125 may periodically poll the catalytic converter sensor 124 to determine the sensor data 222. In some cases, the catalytic converter module 125 may use the filter 218 to filter the sensor data 222, thereby creating filtered data 226. For example, the filter 218 may be used to filter out frequencies that are not associated with tools typically used to remove catalytic converters. To illustrate, the frequencies produced through the contact of a hand tool/cutting tool/impact wrench on the frame or ancillary components typically produce vibrations in the range of about 1 kHz to about 4 kHz. In this example the system may filter out data outside of this range. In some cases, the filter 218 may filter multiple frequency ranges that include the frequency ranges of multiple cutting tools. In this way, by filtering the sensor data 222, false alarms caused by loud sounds occurring near the vehicle may be reduced. If the catalytic converter sensor 124 is an accelerometer, the catalytic converter module 125 may determine vibrational energy (e.g., millivolts per G, where G is the gravitational constant).

The catalytic converter module 125 may determine whether the data (e.g., either the sensor data 222 or the filtered data 226) exceeds the vibration threshold 214 for at least an amount of time that exceeds the duration threshold 216. For example, the catalytic converter module 125 may determine whether the data exceeds about 50 dB or about 0.3 G (vibration threshold 214) for at least about 50 milliseconds (duration threshold 216). If the catalytic converter module 125 determines that the data exceeds the vibration threshold 214 for at least an amount of time that exceeds the duration threshold 216, then the catalytic converter module 125 may perform one or more actions 228. For example, if integrated with the vehicle alarm module, the catalytic converter module 125 may modify the signal 224 provided to the vehicle alarm module 116 (e.g., changing it from closed to open, similar to indicating that a door of the vehicle has been opened), causing the vehicle alarm module 116 to provide a visual indication using the lights 120, an audible indication using the speakers 122, or both, to indicate that someone may be attempting to steal the catalytic converter of the vehicle 102. If installed as a standalone system, the catalytic converter module 125 and the catalytic converter alarm module may provide a visual indication using the lights 208, provide an audible indication using the speakers 210, or both, to indicate that someone may be attempting to steal the catalytic converter of the vehicle 102.

For example, the catalytic converter module 125 may create the baseline measurement for every P minutes (P>0) over a particular time interval (e.g., 24 hours or greater). After creating the baseline 220, the catalytic converter module 125 may continue to receive the sensor data 222 from the catalytic converter sensor 124 and subtract the baseline 220 from the sensor data 222 (or the filtered data 226) to determine a difference. If the difference between the baseline 220 and the sensor data 222 exceeds a vibration threshold 214, then the catalytic converter module 125 may perform one or more actions, such as changing the signal 224 (e.g., from closed to open) to cause the vehicle alarm module 116 to flash the lights 120 (e.g., headlights) and/or emit an audible signal via the speakers 122, causing the lights 208 to flash, causing the speakers 210 to emit an audible alert, wirelessly transmitting the wireless alert 126, or any combination thereof.

Whether or not the catalytic converter sensor 124 and catalytic converter module 125 are integrated with the vehicle alarm module, the catalytic converter module 125 may use the wireless communication module 204 to wirelessly transmit the wireless alert 126 to one or more user devices 134 (e.g., a smart phone associated with an owner of the vehicle, a key fob associated with the vehicle, or a central computer to monitor the vehicles at a dealership, or the like) or a server 128 (e.g., a central server in the case of a dealership, a bus depot, or the like). If the alert is sent to the server 128, then the server 128 may send the message 132 to the user device 134 indicating the potential theft of the catalytic converter 112. For example, in the case of a dealership or other area where multiple vehicles are present, the alarm system may send the wireless alert 126 via the networks 130 to the server 128 located at the dealership. In response to receiving the alert 126, the server 128 may send the message 132 to one or more of the user devices 134. The user devices 134 may be associated with a security company that is guarding the dealership, one or more employees of the dealership, or any combination thereof.

Thus, a catalytic converter module may receive sensor data output by a catalytic converter sensor and determine whether an attempt is being made to remove the catalytic converter from a vehicle. For example, if the catalytic converter module determines that the sensor data (e.g., vibration) has exceeded a vibration threshold for at least an amount of time that exceeds the duration threshold, then the catalytic converter module may perform one or more actions to raise the alarm. If the catalytic converter module is integrated with the vehicle alarm module, then the catalytic converter module may modify the signal being provided to the vehicle alarm module in a manner similar to the other sensors indicating that a door is open, thereby causing the vehicle alarm module to provide an audible alarm indication, a visual alarm indication, or both. If the catalytic converter module is a standalone system, then the catalytic converter module may itself, through a catalytic converter alarm module, provide the audible alarm indication, the visual alarm indication, or both. If the catalytic converter module is equipped with a communication module, then the catalytic converter module may wirelessly transmit a wireless alert to a server, to one or more user devices, or both to provide a wireless notification that someone may be attempting to steal a catalytic converter from a vehicle.

Figure 3:
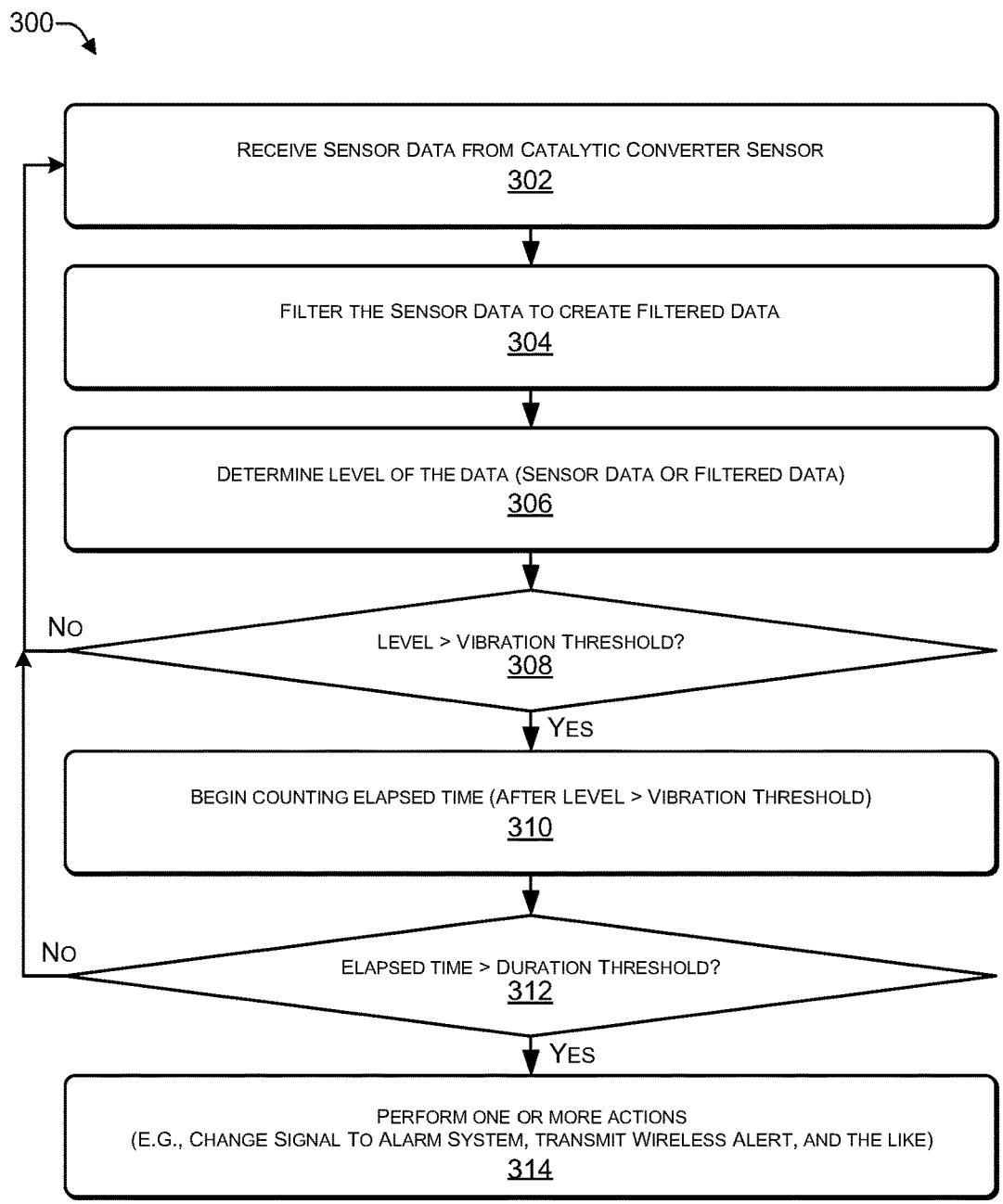
FIG. 3 is a flowchart of a process that includes sending wireless alert after data received from a catalytic converter sensor satisfies one or more thresholds, according to some embodiments.

In the flow diagram of FIG. 3 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 300 is described with reference to FIGS. 1 and 2 as described above, although other models, frameworks, systems and environments may be used to implement this process.

FIG. 3 is a flowchart of a process 300 that includes sending a wireless alert after data received from a catalytic converter sensor satisfies one or more thresholds, according to some embodiments. The process 300 may be performed by the catalytic converter module 125 of FIGS. 1 and 2.

At 302, the process may receive sensor data output by a catalytic converter sensor. At 304, the process may filter the sensor data to create filtered data 226. At 306, the process may determine a level of the data (e.g., the sensor data or the filtered data 226). For example, in FIG. 2, the catalytic converter module 125 may receive the sensor data 222 output by the catalytic converter sensor 124. In some cases, the catalytic converter module 125 may use the filter 218 to filter the sensor data 222 to create filtered data 226. The catalytic converter module 125 may determine level of the data (e.g., either the sensor data 222 or the filtered data 226).

At 308, the process may determine whether the volume or acceleration (signal) exceeds a vibration threshold. If the process determines, at 308, that the signal does not exceed the vibration threshold, then the process may proceed back to 302 to receive additional sensor data output by the catalytic converter sensor. For example, in FIG. 2, the catalytic converter module 125 may determine whether the sensor data 222 (or the filtered data 226) exceeds the vibration threshold 214. If the catalytic converter module 125 determines that the sensor data 222 (or the filtered data 226) fails to exceed the vibration threshold 214, then the catalytic converter module 125 may continue to receive additional sensor data from the catalytic converter sensor 124.

If the process determines, at 308, that the volume or acceleration (signal) exceeds the vibration threshold then the process, at 310, may begin counting the elapsed time (e.g., after the signal exceeds the vibration threshold). At 312, the process may determine whether the elapsed time exceeds a duration threshold. If the process determines, at 312, that the elapsed time does not exceed the duration threshold, then the process may proceed back to 302, to receive additional sensor data output by the catalytic converter sensor. For example, in FIG. 2, if the catalytic converter module 125 determines that the sensor data 222 (or the filtered data 226) exceeds the vibration threshold 214, then the catalytic converter module 125 may use the timer 212 to determine how long (e.g., elapsed time) the sensor data 222 (or the filtered data 226) exceeds the vibration threshold 214. If the catalytic converter module 125 determines that the sensor data 222 (or the filtered data 226) exceeds the vibration threshold 214 for at least an amount of time that exceeds the duration threshold 216, then the catalytic converter module 125 may continue to receive additional sensor data from the catalytic converter sensor 124.

If the process determines, at 312, that the elapsed time is greater than a duration threshold, then the process may perform one or more actions. For example, in FIG. 2, if the catalytic converter module 125 determines that the sensor data 222 (or the filtered data 226) exceeds the vibration threshold 214 for at least an amount of time that exceeds the duration threshold 216, then the catalytic converter module 125 may perform one of more of the actions 228. The actions 228 may include, for example, modifying the signal 224 (e.g., from a first signal indicating "closed" to a second signal indicating "open"), causing the lights 208 to flash on and off, causing the speakers 210 to emit an audible alarm, sending the wireless alert 126, or any combination thereof.

Thus, a catalytic converter module may receive sensor data output by a catalytic converter sensor located in a vehicle. The catalytic converter module may modify the sensor data, such as by filtering the sensor data, to create filtered data. The catalytic converter module may determine whether the sensor data (whether filtered or unfiltered data) exceeds a vibration threshold for at least an amount of time that exceeds the duration threshold. If the catalytic converter module determines that the sensor data (whether filtered or unfiltered data) does not exceed the vibration threshold for at least the duration threshold, then the catalytic converter module may continue to receive the sensor data output by the catalytic converter sensor. If the catalytic converter module determines that the sensor data (whether filtered or unfiltered data) exceeds the vibration threshold for at least the duration threshold, then the catalytic converter module may perform one or more actions, such as the catalytic converter alarm module providing an audible and/or visual indicator that a theft of the catalytic converter may be occurring, causing the vehicle alarm module to provide an audible and/or visual indicator that a theft of the catalytic converter may be occurring, transmitting a wireless alert message to a server, to one or more user devices, or any combination thereof. In this way, based on analyzing the catalytic converter sensor output, the catalytic converter module can provide an audible indicator and/or visual indicator to deter the theft of the catalytic converter from the vehicle. The savings for an individual are substantial and the savings for a dealership or other persons or entities responsible for areas where multiple vehicles are located are significant.

Figure 4:
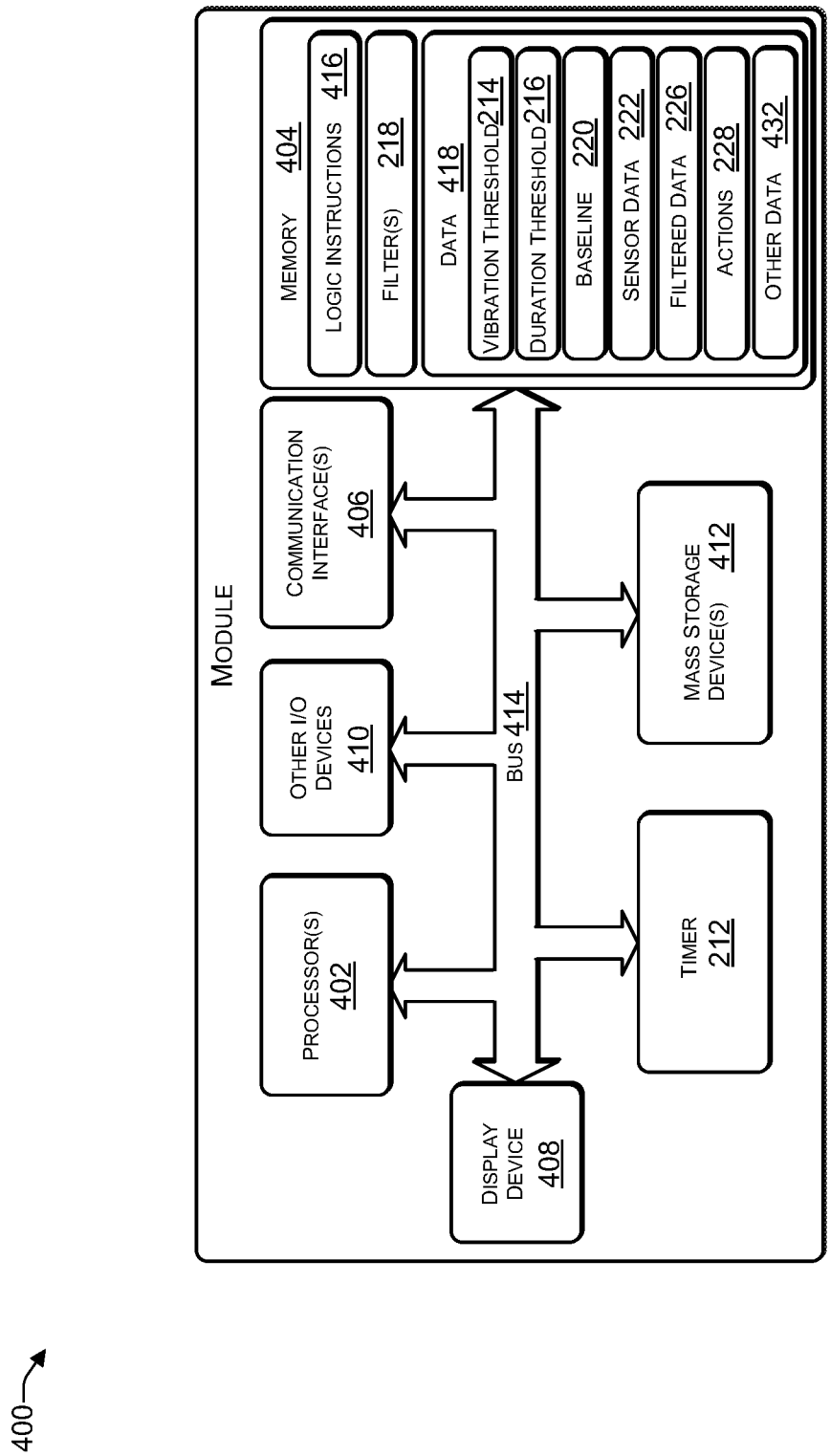
FIG. 4 illustrates an example configuration of a module that can be used to implement the systems and techniques described herein.

FIG. 4 illustrates an example configuration of a module 400 that can be used to implement the systems and techniques described herein, such as, for example, the vehicle alarm module 116, the catalytic converter module 125, the wireless communication module 204, or any combination thereof. For illustration purposes, the module 400 is illustrated as implementing the catalytic converter module 125 of FIGS. 1 and 2.

The module 400 may include one or more processors 402 (e.g., central processing unit (CPU), graphics processing unit (GPU), or the like), a memory 404, communication interfaces 406, a display device 408, other input/output (I/O) devices 410 (e.g., keyboard, trackball, and the like), and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, automotive buses (e.g., CAN, MOST, or the like) etc.

The processors 402 are one or more hardware devices that may include a single processing unit or a number of processing units, all of which may include single or multiple computing units or multiple cores. The processors 402 may include a GPU that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other computer-readable media.

Memory 404 and mass storage devices 412 are examples of computer storage media (e.g., memory storage devices)

for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and may be any type of non-transitory media capable of storing computer-readable, processor-executable program instructions as computer program code that can be executed by the processors 402 as a particular machine configured for carrying out the operations and functions described in the implementations herein.

The module 400 may include one or more communication interfaces 406 (e.g., the wireless communication module 204) for exchanging data via a network (e.g., the network 130). The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users (e.g., a driver of the vehicle). For example, the display device 408 be located on the dashboard of the vehicle. Other I/O devices 410 may be devices that receive various inputs from a user and provide various outputs to the user, and may include a keyboard, a touchpad, a mouse, a printer, audio input/output devices, and so forth.

The computer storage media, such as memory 404 and mass storage devices 412, may be used to store software and data, including, for example, logic instructions 416 (e.g., software, firmware, or a combination thereof), filters 218, data 418, the vibration threshold 214, the duration threshold 216, the baseline 220, the sensor data 222, the filtered data 226, the actions 228, and other data 432. For ease of illustration, not all the software and data associated with the module 400 are shown.

Figure 5:
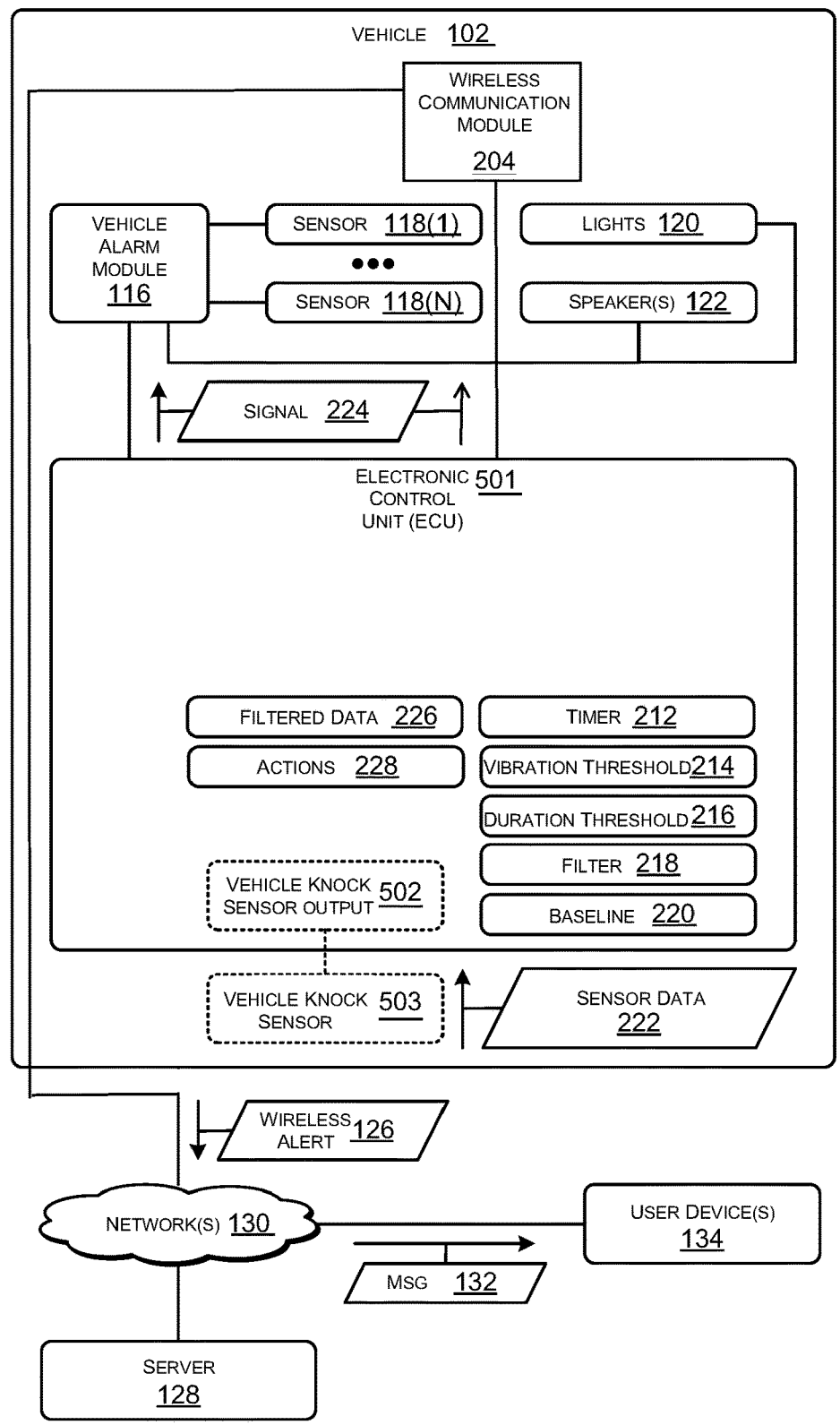
FIG. 5 is a block diagram of a vehicle that includes a system utilizing existing vehicle components, according to some embodiments.

FIG. 5 is a block diagram 500 of a vehicle that includes an alarm system, according to some embodiments. FIG. 5 illustrates an embodiment where the catalytic converter module is an electronic control unit (ECU) 501, the catalytic converter sensor is a vehicle knock sensor 503, and the alarm system is the vehicle alarm module 116 and the wireless communication module 204. The electronic control unit (ECU) 501 may send a signal to a wireless communication module 204 that is capable of sending the wireless alert (or other communication) 126 to the server 128, the user devices 134 or both via the networks 130.

The vehicle knock sensor may periodically (e.g., at a predetermined time interval) provide a vehicle knock sensor output 502 to the electronic control unit (ECU) 501 or the electronic control unit (ECU) 501 may periodically poll the vehicle knock sensor 503 to determine the sensor data 222. In some cases, the electronic control unit (ECU) 501 may use the filter 218 to filter the sensor data 222, thereby creating filtered data 226. For example, the filter 218 may be used to filter out frequencies that are not associated with tools typically used to remove catalytic converters. The measurements shown in previous embodiments is equally applicable in this embodiment.

The electronic control unit (ECU) 501 may determine whether the data (e.g., either the sensor data 222 or the filtered data 226) exceeds the vibration threshold 214 for at least an amount of time that exceeds the duration threshold 216. If the electronic control unit (ECU) 501 determines that the data exceeds the vibration threshold 214 for at least an amount of time that exceeds the duration threshold 216, then the electronic control unit (ECU) 501 may perform one or more actions 228. For example, if integrated with the vehicle alarm module, as illustrated in this embodiment, the electronic control unit (ECU) 501 may modify the signal 224 provided to the vehicle alarm module 116 (e.g., changing it from closed to open, similar to indicating that a door of the vehicle has been opened), causing the vehicle alarm module 116 to provide a visual indication using the lights 120, an audible indication using the speakers 122, or both, to indicate that someone may be attempting to steal the catalytic converter of the vehicle 102.

The baseline and measurements shown in previous embodiments is equally applicable in this embodiment. If the difference between the baseline 220 and the sensor data 222 exceeds a vibration threshold 214, then the electronic control unit (ECU) 501 may perform one or more actions, such as changing the signal 224 (e.g., from closed to open) to cause the vehicle alarm module 116 to flash the lights 120 (e.g., headlights) and/or emit an audible signal via the speakers 122, causing the lights 208 to flash, causing the speakers 210 to emit an audible alert, or to cause the wireless communication module 204 to wirelessly transmit the wireless alert 126, or any combination thereof.

The electronic control unit (ECU) 501 may use the wireless communication module 204 to wirelessly transmit the wireless alert 126 to one or more user devices 134 (e.g., a smart phone associated with an owner of the vehicle, a key fob associated with the vehicle, or a central computer to monitor the vehicles at a dealership, or the like) or to a server 128 (e.g., a central server in the case of a dealership, a bus depot, or the like). If the alert is sent to the server 128, then the server 128 may send the message 132 to the user device 134 indicating the potential theft of the catalytic converter 112. For example, in the case of a dealership or other area where multiple vehicles are present, the alarm system may send the wireless alert 126 via the networks 130 to the server 128 located at the dealership. In response to receiving the alert 126, the server 128 may send the message 132 to one or more of the user devices 134. The user devices 134 may be associated with a security company that is guarding the dealership, one or more employees of the dealership, or any combination thereof.

Thus, an electronic control unit may receive sensor data output by a vehicle knock sensor and determine whether an attempt is being made to remove the catalytic converter from a vehicle. For example, if the electronic control unit (ECU) determines that the sensor data (e.g., vibration) has exceeded a vibration threshold for at least an amount of time that exceeds the duration threshold, then the electronic control unit (ECU) may perform one or more actions to raise the alarm. Because the electronic control unit (ECU) is integrated with the vehicle alarm module, then the electronic control unit (ECU) may modify the signal being provided to the vehicle alarm module in a manner similar to the other sensors indicating that a door is open, thereby causing the vehicle alarm module to provide an audible alarm indication, a visual alarm indication, or both. If the vehicle is equipped with a wireless communication module, the wireless communication module may wirelessly transmit a wireless alert to a server, to one or more user devices, or both to provide a wireless notification that someone may be attempting to steal a catalytic converter from a vehicle.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A tamper detection system for a vehicle, wherein the vehicle comprises at least one vehicle exhaust system and at least one vehicle exhaust component, wherein the at least one vehicle exhaust component is a catalytic converter, the tamper detection system comprising:
    a catalytic converter sensor configured to monitor for at least one vibration from the at least one vehicle exhaust component; and
    a catalytic converter module configured to monitor the catalytic converter sensor for when the at least one vibration exceeds a vibration threshold for at least an amount of time that exceeds a duration threshold;
    wherein the catalytic converter sensor is located on the vehicle outside of the vehicle exhaust system;
    wherein the catalytic converter sensor is a knock sensor; and
    wherein the knock sensor is mounted directly to an engine block;
    wherein the catalytic converter module is configured to activate an alarm system when the vibrational threshold and the duration threshold are exceeded.

2. The system of claim 1, wherein the catalytic converter sensor is a piezoelectric device, a piezoresistive device, a microphone, or an accelerometer.

3. The system of claim 1, wherein the catalytic converter module is a vehicle electronic control unit (ECU).

4. The system of claim 1, wherein the alarm system is a vehicle alarm module or a catalytic converter alarm module.

5. The system of claim 1, wherein the alarm system is wireless communication module configured to transmit at least one wireless alert.

6. A method for detecting tampering with a vehicle, wherein the vehicle comprises at least one vehicle exhaust system and at least one vehicle exhaust component, wherein the at least one vehicle exhaust component is a catalytic converter, the method for detecting tampering comprising:
    (a) sensing a vibration using a catalytic converter sensor located on the vehicle outside of the vehicle exhaust system, wherein the catalytic converter sensor is a knock sensor, wherein the knock sensor is mounted directly to an engine block;
    (b) determining, by using a catalytic converter module, that the vibration sensed exceeds a vibrational threshold for at least an amount of time that exceeds a duration threshold; and
    (c) triggering an alarm system.

7. The method of claim 6, wherein the catalytic converter sensor is a piezoelectric device, a piezoresistive device, a microphone, or an accelerometer.

8. The method of claim 6, wherein the catalytic converter module is a vehicle electronic control unit (ECU).

9. The method of claim 6, wherein step (c) further comprises the step of providing at least one audio alert or at least one visual alert from a vehicle alarm module.

10. The method of claim 6, wherein the step (c) further comprises the step of providing at least one audio alert or at least one visual alert from a catalytic converter alarm module.

11. The method of claim 6, wherein step (c) further comprises the step of (i) wirelessly transmitting at least one wireless alert.

12. The method of claim 11, wherein step (i) comprises using at least one server to receive each wireless alert and wirelessly transmitting each wireless alert to at least one user device.

13. The method of claim 11, wherein the server of step (i) is configured to receive a plurality of wireless alerts from a plurality of tamper detection systems.

14. A vehicle comprising:
    at least one vehicle exhaust system;
    at least one vehicle exhaust component, wherein at least one vehicle exhaust component is a catalytic converter, and at least one tamper detection system;
    wherein the tamper detection system further comprises:
    a catalytic converter sensor configured to monitor for at least one vibration from the at least one vehicle exhaust component; and
    a catalytic converter module configured to monitor the catalytic converter sensor for at least one vibration that exceeds a vibration threshold for at least an amount of time that exceeds a duration threshold;
    wherein the catalytic converter sensor is located on the vehicle outside of the vehicle exhaust system;

wherein the catalytic converter sensor is a knock sensor; and wherein the knock sensor is mounted directly to an engine block;

wherein the catalytic converter module is configured to activate an alarm system when the vibrational threshold and the duration threshold are exceeded.

15. The vehicle of claim 14, wherein the catalytic converter sensor is a piezoelectric device, a piezoresistive device, a microphone, or an accelerometer.

16. The vehicle of claim 14, wherein the catalytic converter module is a vehicle electronic control unit (ECU).

17. The vehicle of claim 14, wherein the alarm system is a vehicle alarm module or a catalytic converter alarm module.

18. The vehicle of claim 14, wherein the alarm system is wireless communication module configured to transmit at least one wireless alert.

* * * * *